United States Patent [19]

Bowen

[11] Patent Number: 5,378,069
[45] Date of Patent: Jan. 3, 1995

[54] ENVIRONMENTALLY SAFE TOUCH TYPING KEYBOARD

[75] Inventor: James H. Bowen, Catharpin, Va.

[73] Assignee: Product Engineering & Mfg., Inc., Catharpin, Va.

[21] Appl. No.: 166,906

[22] Filed: Dec. 15, 1993

Related U.S. Application Data

[63] Continuation of Ser. No. 933,749, Aug. 24, 1992, abandoned.

[51] Int. Cl.⁶ .................................................. B41J 5/10
[52] U.S. Cl. .................................... 400/477; 345/175
[58] Field of Search ................... 400/477, 485, 486; 341/23, 31; 345/175, 179; 364/709.11, 709.12, 709.13

[56] References Cited

U.S. PATENT DOCUMENTS

| | | | |
|---|---|---|---|
| 3,526,775 | 9/1970 | Friedrich et al. | |
| 3,764,813 | 10/1973 | Clement et al. | 250/221 |
| 3,775,560 | 11/1973 | Ebeling et al. | 178/250 |
| 4,243,879 | 1/1981 | Carroll et al. | 250/221 |
| 4,257,443 | 5/1981 | Carroll et al. | 250/221 |
| 4,305,071 | 12/1981 | Bell et al. | 340/364 |
| 4,346,376 | 8/1982 | Mallos | 340/178 |
| 4,387,367 | 6/1983 | Fisher | 340/178 |
| 4,413,314 | 11/1983 | Slater et al. | 364/340 |
| 4,417,824 | 11/1983 | Peterson et al. | 235/145 R |
| 4,484,179 | 11/1984 | Kasday | 340/178 |
| 4,567,480 | 1/1986 | Blanchard | 345/175 |
| 4,591,710 | 5/1986 | Komadina | 345/175 |
| 4,672,364 | 6/1987 | Lucas | 340/250 |
| 4,692,739 | 9/1987 | Dorn | 341/31 |
| 4,695,827 | 9/1987 | Beining | 345/175 |
| 4,700,176 | 10/1987 | Adler | 340/365 |
| 4,701,747 | 10/1987 | Isherwood | 341/31 |
| 4,703,316 | 10/1987 | Sherbeck | 345/175 |
| 4,766,424 | 8/1988 | Adler et al. | 340/712 |
| 4,777,375 | 10/1988 | Bozzuto | 341/31 |
| 4,796,007 | 1/1989 | Heys, Jr. | 341/200 |
| 4,799,044 | 1/1989 | Masters | 341/31 |
| 4,800,264 | 6/1989 | Vissiere | 250/340 |
| 4,812,830 | 3/1989 | Doering | 340/712 |
| 4,812,833 | 3/1989 | Shimauchi | 345/175 |
| 4,901,584 | 2/1990 | Brunner | 341/31 |
| 4,904,857 | 2/1990 | Ando | 345/175 |
| 5,055,840 | 10/1991 | Bartlett | 341/31 |
| 5,105,186 | 4/1992 | May | 341/31 |

OTHER PUBLICATIONS

IBM Technical Disclosure Bulletin, vol. 20 No. 4 Sep. 1977 S75180086M.

*Primary Examiner*—David A. Wiecking
*Assistant Examiner*—Steven S. Kelley

[57] ABSTRACT

A keyboard that has two adjacent rows of emitters opposed by two adjacent rows of detectors that is environmentally sealed and has no moving parts. This said keyboard has a field changeable coded indicia so a scan pattern, ambient reference level or other application specific variables can be changed without breaking the environmental seal or powering down the keyboard. Further, the different said scan patterns can include scanning the finger position by multiple emitter detector pairs at angles other than ninety degrees to give a cross check on detection. These said scan patterns can be further optimized to scan angled sets of keys and to adjust to different ambient light conditions so errors can be detected by the emitter detector pair closest to detection of a finger. Also another said scan pattern can include, that both emitter detector pairs before and after the detected finger position must show a no finger detection condition to be a valid finger detection. This said keyboard can also use one value of feedback gain to check ambient light and a different value to detect a finger by the same detectors scanning the keyboard.

25 Claims, 8 Drawing Sheets

ENVIRONMENTALLY SAFE TOUCH TYPING KEYBOARD

This application is a continuation of application Ser. No. 07/933,749, filed Aug. 24, 1992, now abandoned.

BACKGROUND OF THE INVENTION

1. Field of the Invention

The present invention generally relates to input devices for computers and other devices that need data entry by a person skilled in "Touch Typing" where speed of entry and being environmentally safe are the main concern.

2. Description of the Prior Art

There are no environmentally safe keyboards commercially available or prior art to date that can be used for Touch Typing or where speed of entry is addressed.

One type of keyboard that is environmentally safe and is accepted by the largest number of users is commercially available in the form of a keyboard with membrane switches. Membrane being one that has etched tracks on a printed circuit board (PCB) and over top of the tracks is a conductive membrane that is deflected by a persons finger to the extent it connects the tracks on the PCB giving a switch closure location to the host device. The main drawbacks of these devices are the pressure to make the contact is high and the life expectancy is only one to three million operations because the key domes break due to flexing. These keyboards come in a variety of key patterns, from standard looking typewriter to square matrix types, none of which are being used for Touch Typing.

The second type is made from standard individual switch type keyboards that are used for data entry to computers. In particular they put commercially available covers over the keyboard that only seal from the top, are unsightly to the professional and also restrict Touch Typing.

Disclosures and letters patents have disclosed various other methods of keyboards. None of which are commercially available. They use emitters and detectors for input coordinates for keys. All operate with a fixed grid of recesses for keys and emit the light beam through various types of lenses at each key location, to name two: IBM Technical Disclosure Bulletin, Vol. No. 4, September 1977, S75180086M and U.S. Pat. No. 4,387,367, Fisher. Both, as others, are not for Touch Typing because your finger must go into a hole in a fixed grid key location to block the light path. A person skilled in Touch Typing is only concerned about what they are looking at, the data that is being displayed on the display and not where they are putting their trained fingers. With a standard key switch type of keyboard it does not matter where you touch the key cap only that you touch the right one. The typist may put their finger in the exact same location each time they type a key, but the location could be anywhere on the key cap, and they are not expecting to hit a hole or individual recess. These types of keyboards are also not easily cleaned because of the plurality of key location recesses.

Other Letters Patents have been allowed for touch screen computer entry devices over CRT's. They display various patterns on the CRT for persons wanting to interface with the device. Some of the patterns have been in a pattern similar to the standard typewriter, but the attitude of the CRT and the intended use is not for Touch Typing. The similar keyboard pattern is only there so a person skilled in Touch Typing will know where to look to point their finger to input data. To emphasize this more, most of the key arrangements are a,b,c, . . . z and not QWERTY.

One CRT device uses the detector to sense ambient light prior to detecting an object and adjusts the threshold of the sensing circuit. This is disclosed in U.S. Pat. No. 4,243,879, Carroll et al. This disclosure does have short comings, two of which are, it lacks the ability to give a warning of an error or to adjust the output of the emitter if the ambient is of a high enough nature to be out of its preset difference between detection of an object and the ambient threshold. Obviously these disclosures are for detection means to be used over more vertical displays that are recessed to shield ambient light and would not successfully satisfy the more horizontal position of a Touch Typing keyboard. Also in the industrial areas where environmentally safe keyboards are used Underwriters Laboratories states that a CRT must withstand the energy of a five foot pound steel ball drop test and not explode into the operators environment. In practice this means a thick piece of polycarbonate over the CRT. Further emphasizing that CRT's are not used or intended for Touch Typing.

SUMMARY OF THE INVENTION

To date none of the prior art has addressed the problem of being able to be used for Touch Typing or speed of entry, it is therefore the object of this invention to provide an environmental sealed keyboard that can be used for speed typing with no moving parts, that is versatile enough to be made in different sizes for different speed typing needs, and by the light beam passing over a plurality of key locations and not through individual key recess lenses that can be easily wiped clean. Also by field changing a printed indicia to a different pattern different scan techniques can be used to optimize the different key text patterns. By having the indicia changeable multiple levels of access to the keyboard and a host can be accommodated for different persons. When changing said indicia different ambient levels can be set to optimize different applications. To incorporate a new and different scan technique for detecting an input. And because of no moving parts be easily assembled, have a longer life expectancy and low in cost.

Briefly, this invention contemplates having two adjacent rows of emitters opposed by two adjacent rows of detectors in a pattern of approximately six vertical by nineteen horizontal, but not limited to, for detecting the presents of a finger or other object. Also having ambient light sensitive detectors to be coded by a field changeable indicia so a scan pattern, ambient reference level or other application specific variables can be changed in the keyboard without breaking the environmental seal or powering down the keyboard. By using the divergent angle of the rays of the emitters and detectors so said coded patterns can be scanned at ninety degrees or angles formed by the adjacent detectors for optimizing the different keyboard patterns. And scanning the finger position by the ninety degree detectors and another angle would give a second cross check of finger location or ambient change.

A further object of this invention is in the different said scan patterns they can include in the scanning sequence, the amplitude of the emitter, by increasing or decreasing the turn-on pulses, can be optimized and the gain of the detector amplifier can be optimized by changing the feedback. These optimizations are to adjust the keyboard to different ambient light conditions so errors can be detected by the emitter detector pair being scanned at the closest possible physical location to sensing a finger or other object.

A further object of this invention is in the different said scan patterns, they can include, a scan sequence whereby when the ambient light is sensed, and then an opposing emitter is turned on and is not detected by the detector, a check of the n+1 and the n−1 emitter detector pairs are checked, and if both detect their emitter then the finger is present.

And a further object of this invention is to be able to use one feedback gain to sense ambient light and a different gain to detect a finger or other object with the same emitter detector pair.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENT OF THE INVENTION

Figure 1:
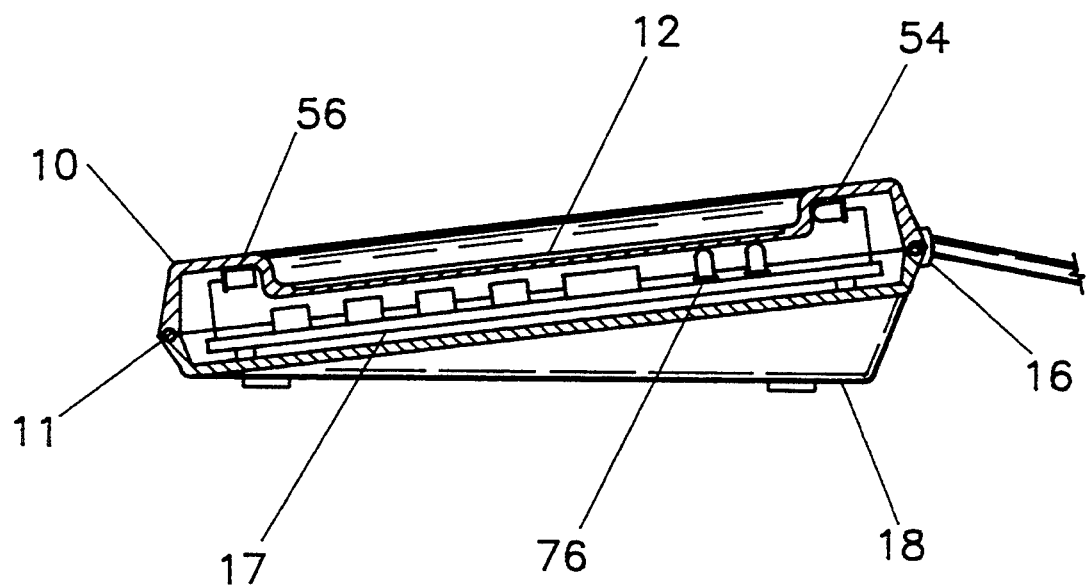
FIG. 1 are cross sections of the mechanical layout of the keyboard in accordance with the teachings of this invention.

Referring now to the drawings, in which the same reference numeral indicates the same element in the various Figures, FIG. 1 shows a upper housing 10 that registers the indicia 12 over the detector 56, the emitter 54 and the scan pattern coding detectors 76. The indicia pattern can be printed on the upper housing 10. The detector 56 and the emitter 54 are sensitive in the infra red spectrum of light and are used to sense the presents of a finger or other object. The detector 56 is also used to, on the fly, calibrate the keyboard to ambient light. The detectors 76 are also sensitive in the infra red spectrum of light and through the binary system can give four, but not limited to, different field changeable code patterns for scanning the keyboard. When the indicia pattern is printed on the upper housing 10 the code patterns can be fixed or changeable by using adhesive pads.

The indicia 12 has the key pattern for a given application, it may be a square pattern for small accountant type Touch Typing applications, or a standard Touch Typing key pattern as in the "Qwerty" type for word processing or data entry. The indicia can have raised areas at the key location for the applications where tactile feedback is needed. Having the raised area only on the indicia allows different locations of the raised areas on different individual indices. Those skilled in the art could also vary these patterns in any number of configurations. The indicia 12 also has areas that are aligned with detectors 76. By putting an infra red opaque material in these areas, code the scan pattern for a given key pattern.

The indicia 12 can be held in place by different mediums depending on the applications. There are various types of adhesive systems, some are permanent, semipermanent and the Velcro like, any of these types could be used. The indicia 12 can also be of a thicker material and snapped or otherwise held in place.

PCB 17 is the etched circuit and secures the electronics in the keyboard.

Seals 11 and 16 are used between the top cover 10 and the bottom cover 18 to seal the periphery of the keyboard and a cable to the host, respectively, against egress of environmental contaminants. If the keyboard is transmitting by other means, such as FM, then the cable and cable seal are not needed. These arrangements of mechanics allow for a sealed keyboard with no moving parts.

Figure 2:
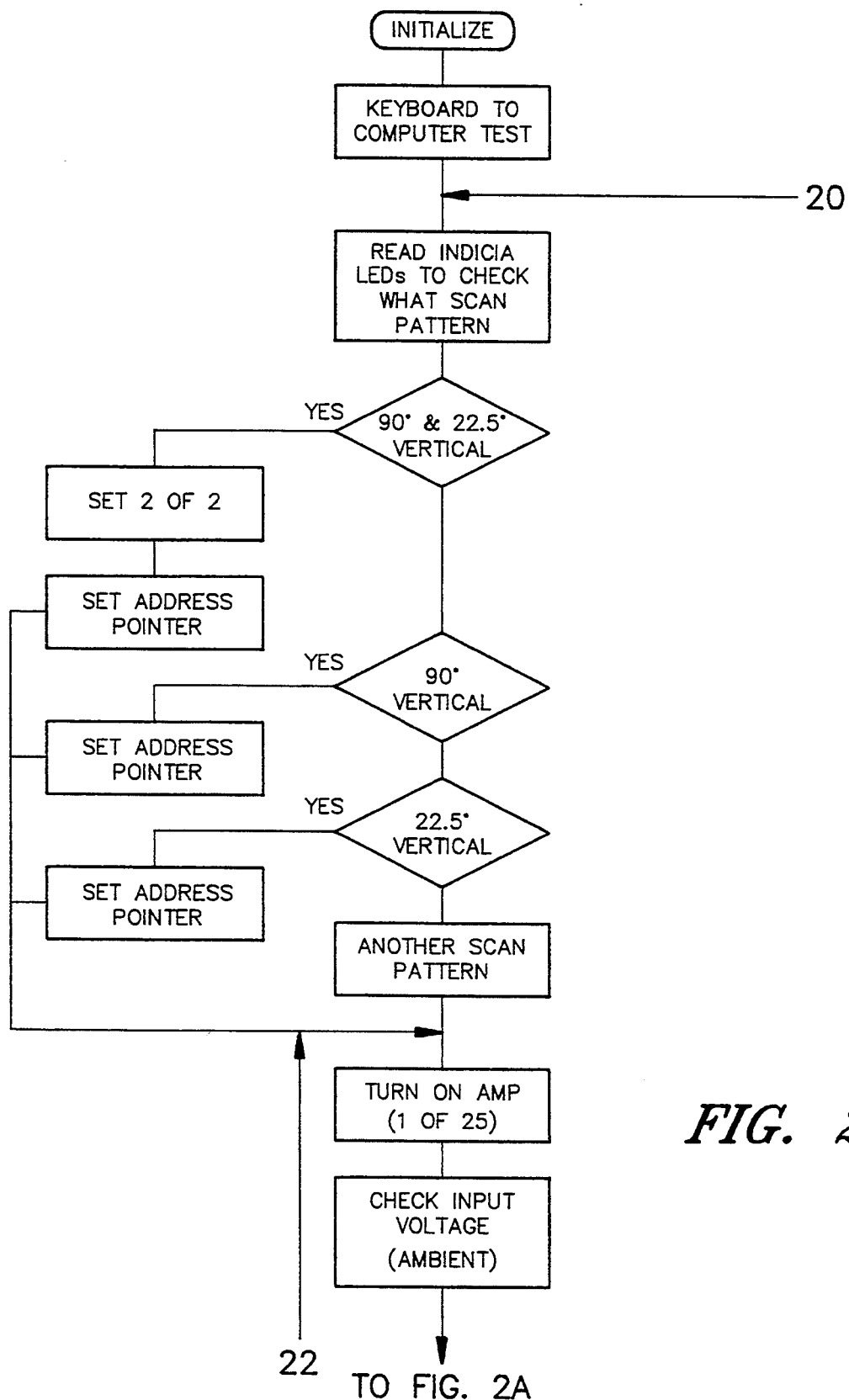
FIGS. 2, 2A and 2B is a flow diagram illustrating the functions of the keyboard in accordance with the teachings of this invention.

FIG. 2 is a flow diagram of functions specific or particularly advantageous to the operation of this invention. The communication link, key roll overs and the ANSI letter codes for keyboards are of the same type that have been disclosed through various publications and will be considered disclosed prior to this invention.

The INITIALIZE will set the different parameters for the keyboard on power up and any host application specific information for the host. KEYBOARD TO COMPUTER TEST is the hand shaking between the host and the keyboard and when data from the initial keyboard test is transmitted to the host. The sequence that starts the keyboard scan starts at READ INDICIA LEDs TO CHECK WHAT SCAN PATTERN. At this point the detectors 76 in FIG. 1 are checked for the pattern to be scanned. Having the check at this point allows for the indicia to be changed without powering down the keyboard. At 90 & 22.5 VERTICAL if the detectors 76 in FIG. 1 decode for this scan pattern a branch is made to SET 2 OF 2 where because two cross checks, but not limited to, at different angles will be made on certain locations this register must be set to be tested and decremented later in the flow diagram. SET ADDRESS OF POINTER gives the starting location for the sequence of scan. If detectors 76 of FIG. 1 are checked to be only one scan for a finger location then a branch is made at 90 VERTICAL or 22.5 VERTICAL depending on the application. At block ANOTHER SCAN PATTERN any number of different scan patterns for different applications can be programed. Although only three different types are in detail, others skilled in the art could have an application requiring others like, cross checking each finger location with three or more different angled opposing emitters and detectors, or setting a different reference level for the ambient check, possibly to be used with keyboards that are being operated at different angles.

Figure 4:
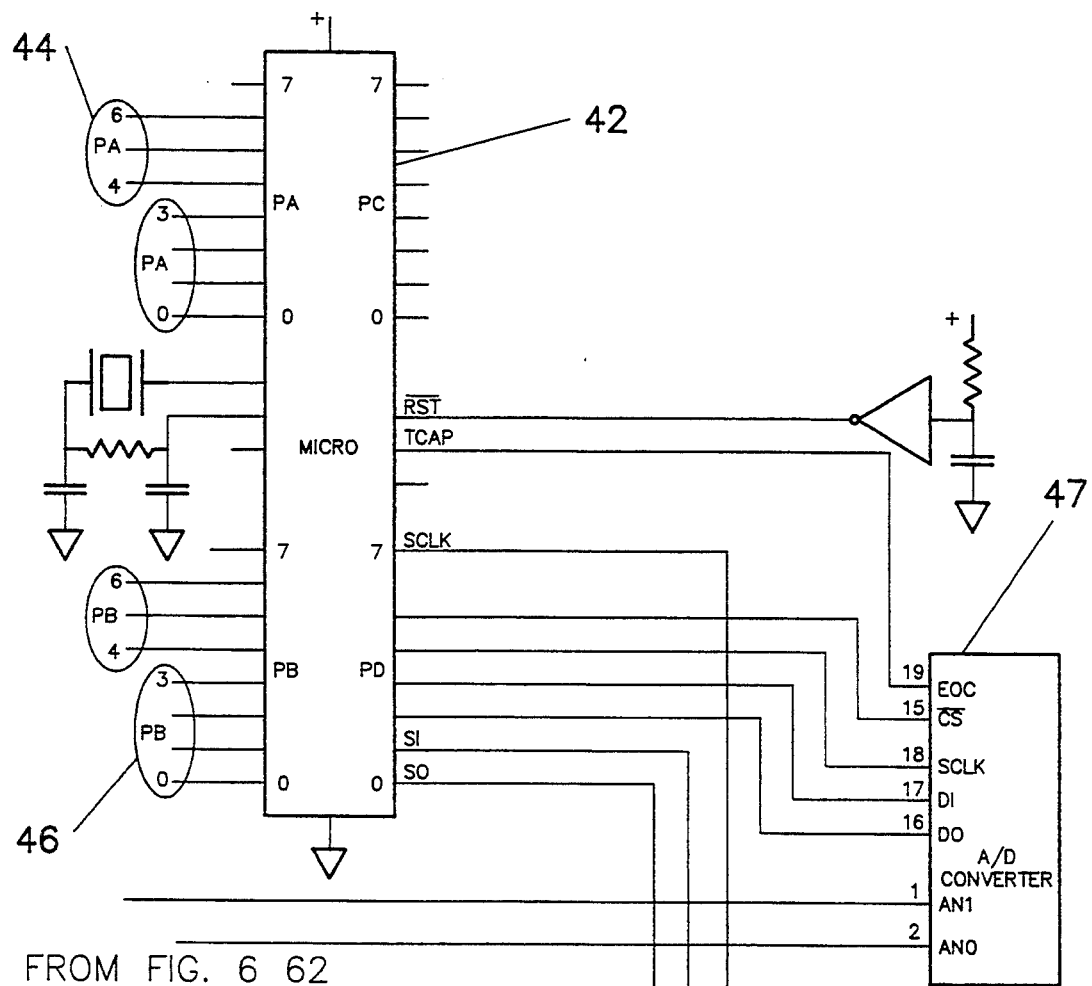
FIG. 4 is a schematic showing the microprocessor section of the invention in accordance with the teachings of this invention.
Figure 5:
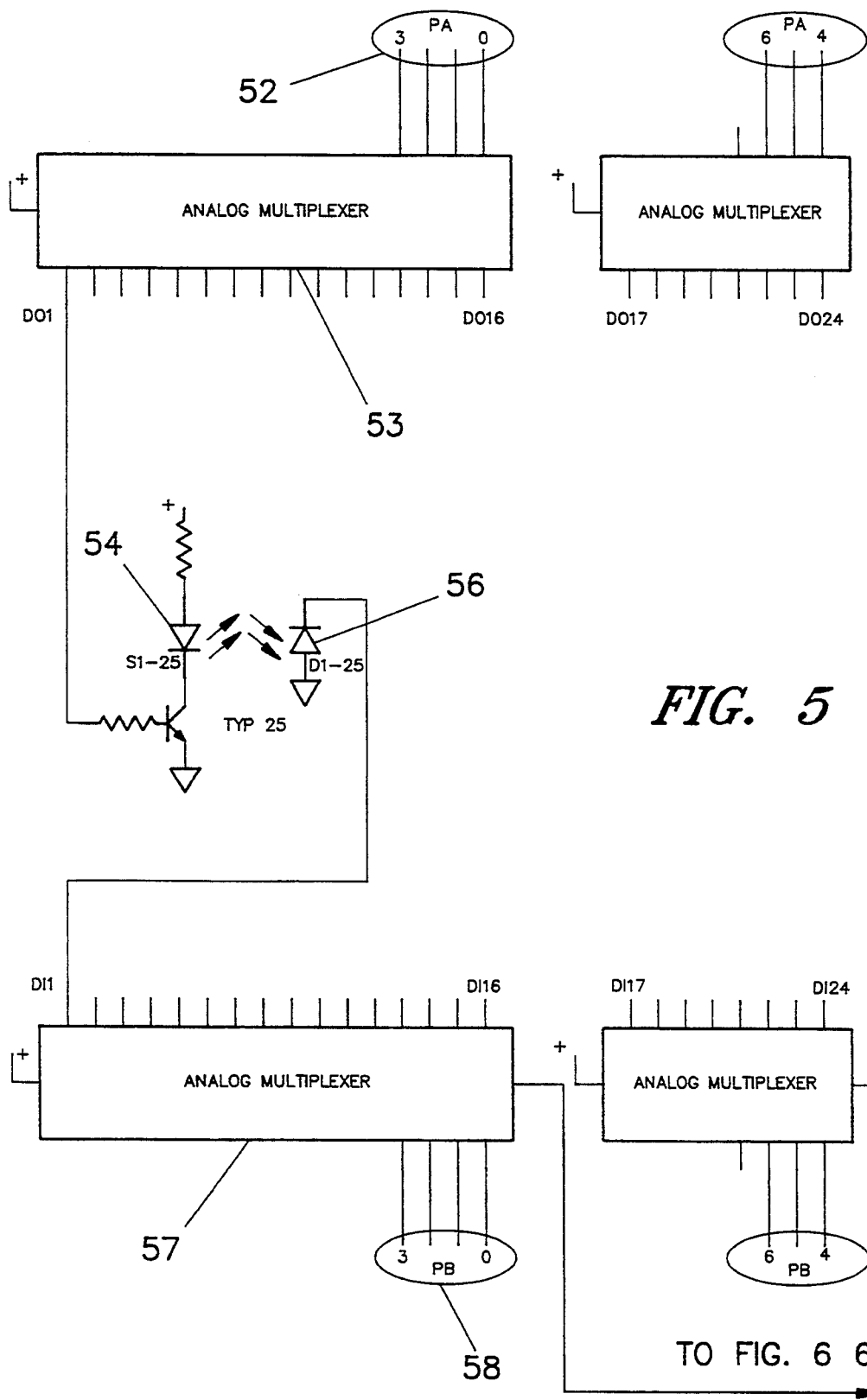
FIG. 5 is a schematic showing the elements that comprise the emitter and detector selectors of the invention in accordance with the teachings of this invention.
Figure 6:
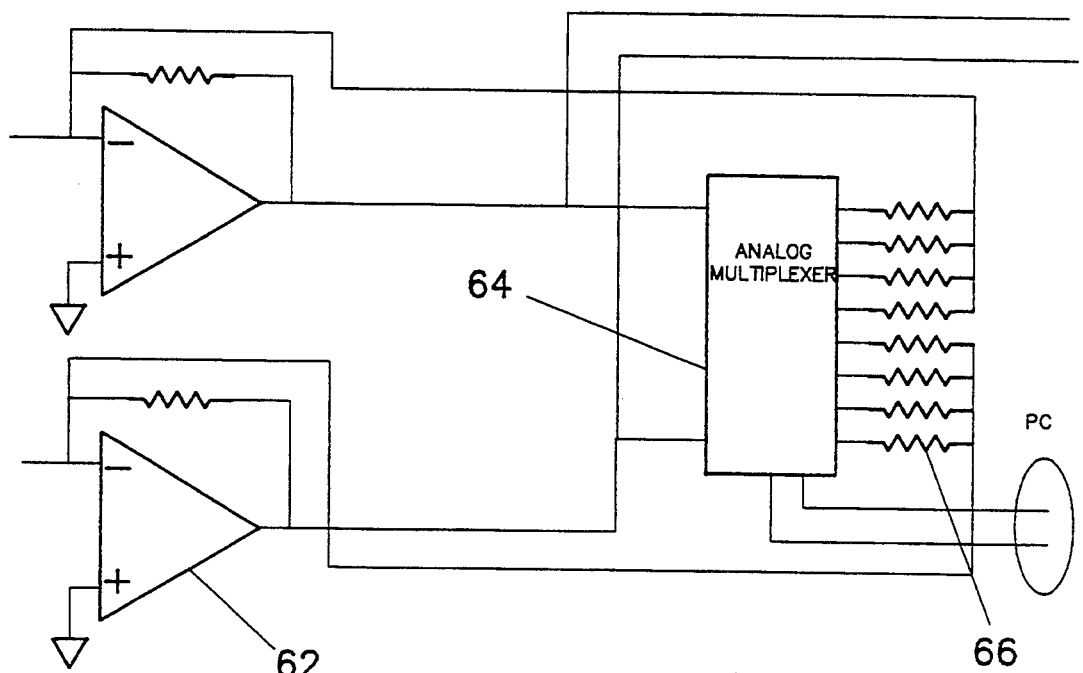
FIG. 6 is a schematic showing the detector amplifiers variable feedback gain control in accordance with the teachings of this invention.

At TURN ON AMP one of the twenty-five detectors 56 in FIG. 5 is addressed by the micro 42 in FIG. 4 through port at 46 to 58 of FIG. 5 and is connected through multiplexer 57 to amplifier 62 of FIG. 6.

CHECK INPUT VOLTAGE takes the input analog voltage and converts that voltage to serial digital data at 47 of FIG. 4. This data is read by micro 42 where the data is tested. Since the opposing emitter 54 of FIG. 5 has not been turned on the voltage is an ambient light representation. Depending on the ambient condition, the ambient check can use a different value of feedback than is used to detect a finger. If after the ambient check a different value of feedback is needed that feedback is switched in by the multiplexer 64 of FIG. 6.

Voltage limits are stored in the micro. At IS VOLTAGE IN LIMITS in FIG. 2A the input voltage is tested to those limits. If the voltage is not in limits it is checked to be high at VOLTAGE HIGH and if it is high a test is made at VALUE OF FEEDBACK AT HIGHEST to see if the present selected feedback resistor 66 of FIG. 6 is the highest, if not then the next higher value is selected by micro 42 FIG. 4 with the multiplexer 64 of FIG. 6 at INC FEEDBACK and then returned to IS VOLTAGE IN LIMITS for a retest. If at VOLTAGE HIGH the voltage is low then a test is made at VALUE OF FEEDBACK AT LOWEST to see if the present feedback resistor is the lowest, if not then the next lower value is selected by micro 42 FIG. 4 with the multiplexer 64 of FIG. 6 at DEC FEEDBACK and then returned to IS VOLTAGE IN LIMITS for a retest. If at VALUE OF THE FEEDBACK AT HIGHEST or VALUE OF THE FEEDBACK AT LOWEST the highest or the lowest feedback resistor has already been selected then they return to the positive decision of IS VOLTAGE IN LIMITS to turn on the emitter at TURN ON LED. At this point one of the twenty-five emitters 54 in FIG. 5 is addressed by the micro 42 in FIG. 4 through port 44 to 52 of FIG. 5 and is connected through multiplexer 53 to said emitter 54.

The detector 56 of FIG. 5 is then tested to see if it is receiving the emitters on condition at DETECTOR VOLTAGE IN LIMITS. In this flow diagram only a vertical scan of the nineteen detectors are made, and if a finger has been detected then the horizontal scan is initiated. Those skilled in the art could obviously see that different applications might necessitate the need for scanning the horizontal detectors first or any number of other scan patterns.

By testing to see if the horizontal scan is completed means that a finger has been detected. If the detector voltage is in limits a test is made at HORZ SCAN COMPLETED, if it is completed then program returns to 20 of FIG. 2. If the decision is no the scan address is incremented at INC TO SCAN ADDRESS n+1 and the program returned to 22 of FIG. 2. If at FIG. 2A, DETECTOR VOLTAGE IN LIMITS the voltage is not in limits, meaning a finger has been detected or there is a faulty detector or emitter, then the program progresses to FIG. 2B. At DETECTOR n−1 IN LIMITS a test is made to check if the last detector emitter pair test in limits, if not then a branch is made to DETECTOR n−2 IN LIMITS to see if it is in limits, if it is not in limits then a test is made to see if the voltage is high or low at DETECTOR VOLTAGE HIGH.

If the test at DETECTOR n−1 IN LIMITS or the test at DETECTOR n−2 IN LIMITS is yes then a test is made to see if the next detector emitter pair test in limits at DETECTOR n+1 IN LIMITS, if not then a branch is made to DETECTOR n+2 IN LIMITS to see if it is in limits, if it is not then a test is made to see if the voltage is high or low at DETECTOR VOLTAGE HIGH. The amplitude of the emitter is adjusted by a frequency of pulses that are used to turn it on. The detector 56 of FIG. 5 detects this amplitude or frequency as highs and lows. If at DETECTOR VOLTAGE HIGH the voltage is high then a test is made to see if the number of pulses are the least amount at PULSES AT LOWEST. The least amount of pulses are preprogramed into the micro to match different applications as are the highest amount of pulses as will be explained later in this embodiment. If at DETECTOR VOLTAGE HIGH the voltage is low then a test is made to see if the number of pulses are at the highest amount at PULSES AT HIGHEST. If the pulses are at the lowest or the highest a branch is made to ERROR REGISTER AT HIGHEST to test if the correct number of failed tries have been made to flash an error message, if so the error message is initiated at FLASH ERROR MESSAGE and returned to 26 of FIG. 2A. If the correct number of failed tries have not been made then a branch is made to INC ERROR REGISTER where the error register is incremented by one and the program is returned to 24 of FIG. 2A.

Figure 2A:
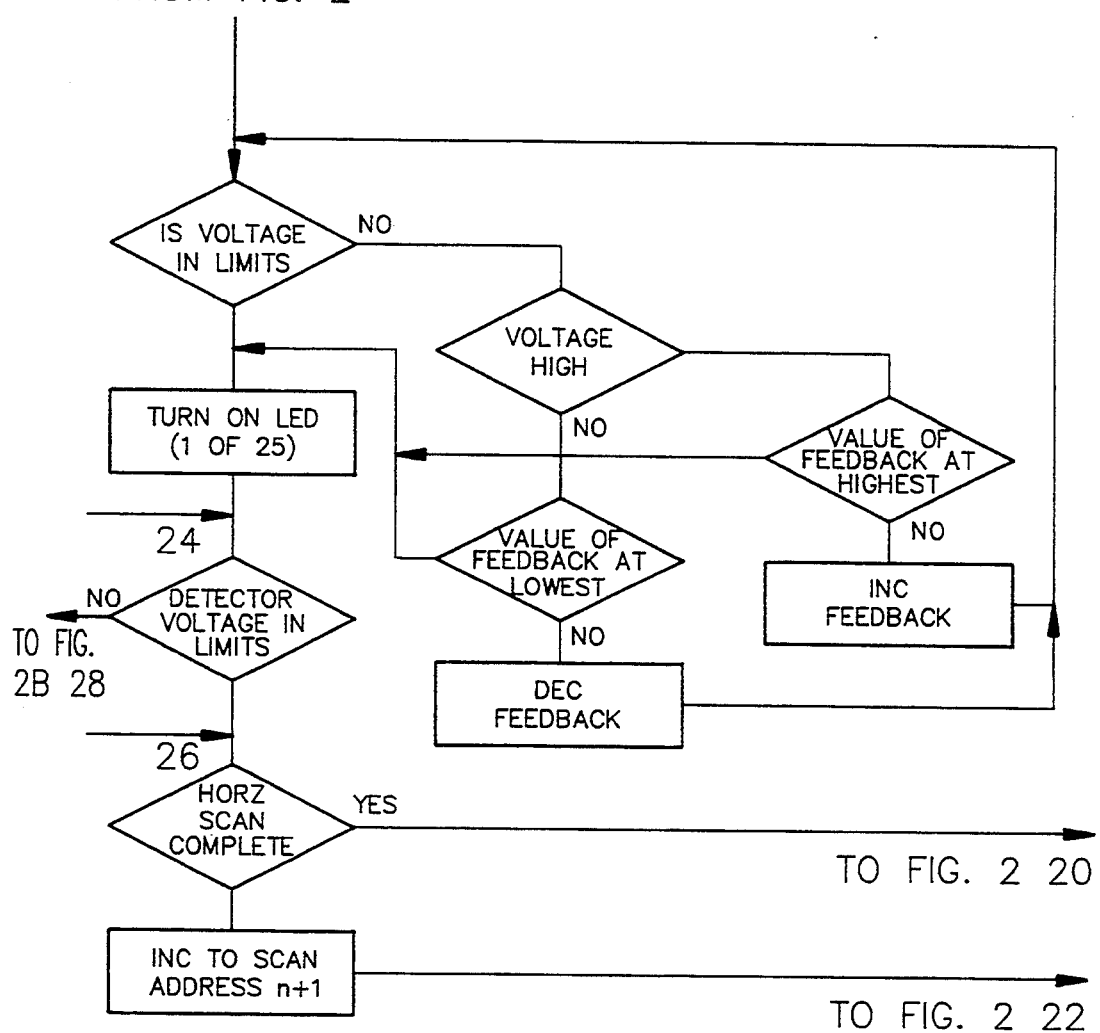
Figure 2B:
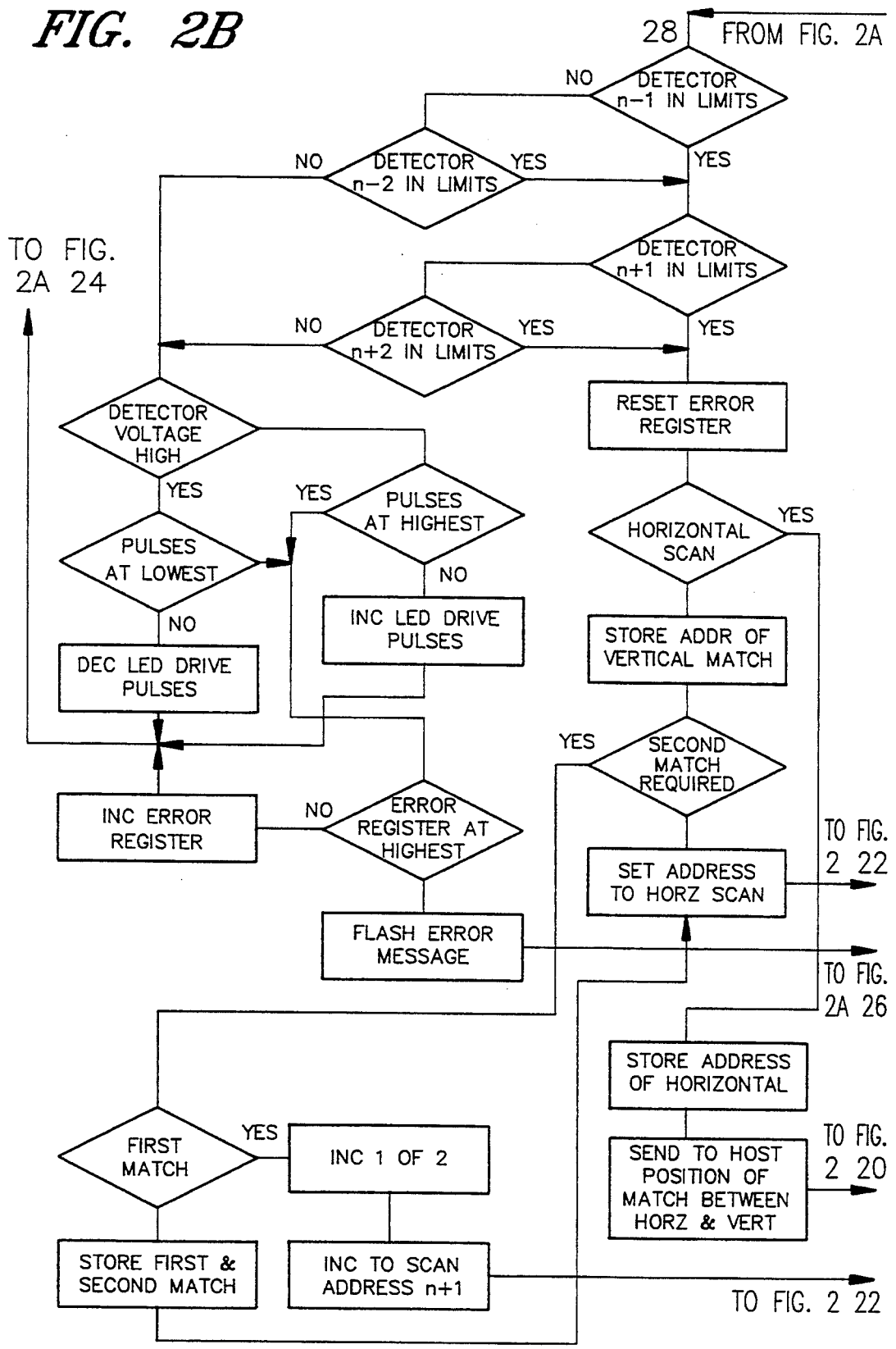

If at PULSES AT HIGHEST the pulses are not at the highest, then the next increment of preprogramed pulses are loaded at INC LED DRIVE PULSES and the program is returned to 24 of FIG. 2A. If at PULSES AT LOWEST the pulses are not at the lowest, then the next increment of preprogramed pulses are loaded at DEC LED DRIVE PULSES and the program is returned to 24 of FIG. 2A.

This embodiment describes a method of scanning for a finger that if a finger is detected, both emitter detector pairs, before and after the detected finger position must show an on condition to be a valid key detection. Those skill in the art could obviously see that different applications could necessitate the need for scanning only to see if a finger was detected.

If at DETECTOR n+1 IN LIMITS or DETECTOR n+2 IN LIMITS the decision is yes, meaning that emitter detector pairs on both sides of the detected finger location are in limits, then the keyboard has seen a finger so the program advances to RESET ERROR REGISTER to clear any failed tries and moves to the decision HORIZONTAL SCAN. Since in this flow diagram the vertical scan is scanned first, if the finger position that has just been scanned is from the vertical scanning sequence, the horizontal scan must be checked to give the position of the finger. If the decision is no at HORIZONTAL SCAN then the address of the vertical detection is stored at STORE ADDR OF VERTICAL MATCH and then see if a different cross angle check Is needed at SECOND MATCH REQUIRED. If a second match is required a branch is made to FIRST MATCH where a test is made to see if this is the first or second match. If it is the first match then a branch to INC 1 OF 2 is made to increment the register to show the second match is now being checked. The next address to be scanned is loaded at INC TO SCAN ADDRESS n+1 and the program is returned to 22 of FIG. 2. If at FIRST MATCH it is the second match then the first and second matches are stored at STORE FIRST & SECOND MATCH. This also means that vertical scanning is completed, so the first horizontal address is loaded at SET ADDRESS TO HORZ SCAN. The program is then returned to 22 of FIG. 2. If at SECOND MATCH REQUIRED the second vertical match Is not required the first horizontal address is loaded at SET ADDRESS TO HORZ SCAN. The program is then returned to 22 of FIG. 2. Now moving back to HORIZONTAL SCAN, if the match was made on the horizontal scan, then the address is stored at STORE ADDRESS OF HORIZONTAL and the matches between the single or multiple vertical and horizontal positions, depending on the host, could be sent to the host through connector 48 or FM transmitter/receiver 49 of FIG. 4 or maintained in the keyboard for later transmission back as ANSI characters or other data groups. The program is then returned back to 20 of FIG. 2.

Figure 3A:
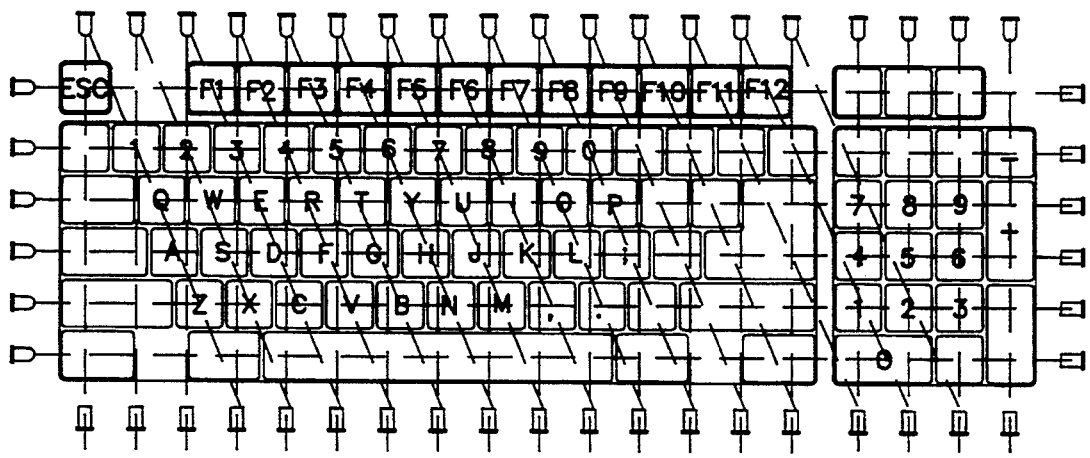
FIGS. 3A and 3B are a diagram of the various scan patterns of the keyboard in accordance with the teachings of this invention.
Figure 3B:
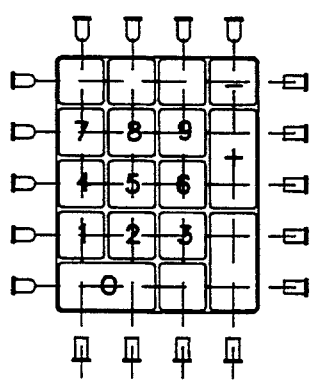

FIG. 3 shows two standard key patterns for Touch Typing keyboards. It shows that some of the keys are better scanned at about twenty-two degrees, some at ninety and some at angles between ninety and about twenty-two degrees. Having a keyboard invented for Touch Typing shows that less emitter detector pairs are needed, thus lower cost and better efficiency. It is to be understood that other types of emitter and detector packages could also be used.

In FIG. 4 Audible Key Detection 45 is an option that can be used if the keyboard is not connected to a host or anytime that an audible sound is wanted when a key location is sensed.

Figure 7:
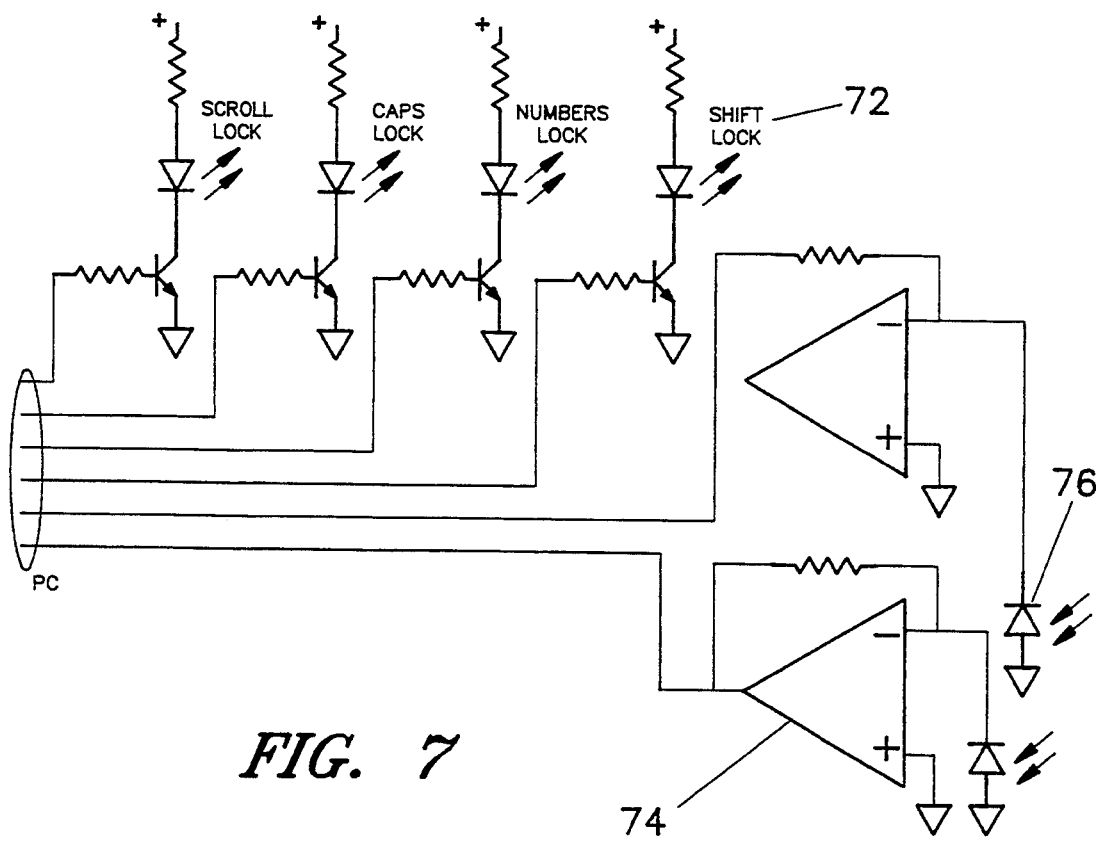
FIG. 7 is a schematic showing the indicia coding detectors and amplifiers, and output LED's for standard keyboard functions in accordance with the teachings of this invention.

In FIG. 7 standard LED's indicators 72 are shown that display Shift Lock, Numbers Lock, Caps Lock and Scroll Lock.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A keyboard for data entry that the positional detection of an operators fingers are made prior to said operators fingers contacting said keyboard, the keyboard further comprising in combination:
   a planar surface forming a substantially flat bottom of an unilocular area;
   a removable overlay with opaque indicia thereon, disposed on said planar surface;
   said opaque indicia being at a plurality of discrete locations disposed in a pattern for indicating key text at each of said plurality of discrete locations;
   a plurality of light emitters and a plurality of light detectors disposed in a pattern about a border surrounding said plurality of discrete locations and above said planar surface;
   said plurality of light emitters are paired with said plurality of light detectors;
   an electronic circuit that illuminates said light emitters to emit light in a path substantially straight to said light detectors, and to scan said pair of light emitters and light detectors in an unimpeded path above and substantially parallel to and coextensive with said planar surface;
   a printed circuit board disposed adjacent to and below said planer surface, connecting said electronic circuit to said plurality of light emitters and said plurality of light detectors; and
   means for scanning said pair of light emitters and light detectors to detect said operators fingers that break said path of said pair of light emitters and light detectors before said operators finger contacts said planar surface at each of said plurality of discrete locations.

2. A keyboard as claimed in claim 1, wherein a plurality of different said removable overlays with different indicia patterns can be differentiated by light detectors that are disposed in a plane perpendicular and below said planar surface for sensing the presents of light through said planar surface by coding with a plurality of different masks affixed to said removable overlays that expose or block light to said light detectors.

3. A keyboard as claimed in claim 2, wherein a scanning pattern can be altered to detect at least said operators fingers over said different indicia patterns with said plurality of different masks on said plurality of different said removable overlays.

4. A keyboard as claimed in claim 3, wherein said different scanning patterns can pair said light emitters with a plurality of different said light detectors to scan said opaque indicia at different angular alignments to coincide with said different indicia patterns.

5. A keyboard as claimed in claim 1, wherein said removable overlay has a plurality of domes extruded in a vertical direction from the surface of said removable overlay with said opaque indicia atop each of said plurality of domes; and
said removable overlay is sufficiently thin and pliable to allow said operators fingers to depress said domes to give tactile feedback to said keyboard operator.

6. A keyboard as claimed in claim 2, wherein said light detectors are scanned periodically to detect different said removable overlays to enable said removable overlays no be changed without powering down said keyboard.

7. A keyboard as claimed in claim 1, further including adjustable gain amplifiers to receive the output of said light detectors so the gain for said adjustable gain amplifiers for detecting ambient light intensities can be different from said gain from said adjustable gain amplifiers for detecting said operators finger.

8. A keyboard as claimed in claim 1, further including variable frequency drive circuits for said light emitters to change the on and off time of said light emitters so different intensities of light emissions from said light emitters can be emitted.

9. A keyboard as claimed in claim 1, wherein a scanning pattern that when a detection is made of an object, said operators finger or ambient light interference, said scanning pattern scans said pairs of light emitters and light detectors for a valid light path immediately before and after said pair of light emitter and light detector that made said detection;
a said valid light path being when said light emitter is illuminated and that emitted light is detected by a predetermined said light detector; and
if said valid light path is present immediately before and after said pair of the light emitter and light detector that made said detection, a valid detection of an object is recorded.

10. A keyboard as claimed in claim 1, further including
an upper and lower housing to enclose the electronic circuits with a plurality of environmental seals disposed about the periphery at the connection of said upper and lower housing to seal said keyboard from environmental contaminants.

11. A keyboard as claimed in claim 1, further including a speaker for generating an audible feedback to said operator for at least said operators finger detection.

12. A keyboard as claimed in claim 1, further including adjustable gain amplifiers to receive the output of said light detectors so the gain for said adjustable gain amplifiers for detecting ambient light intensities can be varied, wherein each said light detector that is being scanned to detect at least said operators finger corrects for ambient light intensities prior to scanning for said operators finger; and whereby the said light emitter is illuminated and said electronic circuit tests a predetermined said light detectors said adjustable gain amplifier for predetermined output limits, if the output is less than said predetermined output limits the gain of the said adjustable gain amplifier is increased and retested, and if the output is higher than said predetermined output limits the gain of the said adjustable gain amplifier is decreased and retested.

13. A keyboard as claimed in claim 1, further including variable frequency drive circuits for said light emitters to change the on and off time of said light emitters so different intensities of light emissions from said light emitters can be emitted;

adjustable gain amplifiers to receive the output of said light detectors so the gain for said adjustable gain amplifiers for detecting ambient light intensities can be varied, wherein each said light detector that is being scanned to detect at least said operators finger, corrects for ambient light intensities prior to scanning for said operators finger;

whereby the said light emitter is illuminated and said electronic circuit tests said light detectors said adjustable gain amplifier for predetermined output limits, if the output is higher than said predetermined output limits the gain of the said adjustable gain amplifier is decreased and retested, this cycle continues if the said adjustable gain amplifiers output can not reach the said predetermined output limits until the said adjustable gain amplifiers gain is at the lowest setting, at that time said on and off time of the said variable frequency drive circuit is made less on to decrease the emissions from said light emitter and a test is made to see if the said adjustable gain amplifier is in said predetermined limits, this cycle continues until either the said variable frequency drive circuit is at its lowest intensity and the said adjustable gain amplifiers output can not reach said predetermined output limits, in which an error is recorded, or the said adjustable gain amplifier is in said predetermined output limits, in which said electronic circuit then scans for said operators finger; and if said adjustable gain amplifiers output is lower than said predetermined output limits the gain of the said adjustable gain amplifier is increased and retested, if the output from said adjustable gain amplifiers is still not in limits the said on and off time of the said variable frequency drive circuit is made more on to increase the emissions from the said light emitter and a test is made to see if the said adjustable gain amplifier is in said predetermined limits, this cycle continues until either the said adjustable gain amplifier is in said predetermined limits in which said electronic circuit then scans for said operators finger, or if the said light emitter has been turned on to the highest intensity and the said adjustable gain amplifier is not to said predetermined limits, an error is recorded.

14. A keyboard as claimed in claim 1, further including means for generating, and means for transmitting and receiving data by radio frequency signals responsive to said keyboard operators data entry.

15. A keyboard as claimed in claim 1, wherein said keyboard reduces stresses in said operators fingers by removing the impact between said operators fingers and said keyboard; whereby said operators fingers can touch said keyboard although data entry is made prior to contact therebetween.

16. A keyboard for data entry that the positional detection of an operators fingers are made prior to said operators fingers contacting said keyboard, the keyboard further comprising in combination:

a planar surface forming a substantially flat bottom of an unilocular area with indicia on said planar surface at a plurality of discrete locations disposed in a pattern for indicating key text at each of said plurality of discrete locations;

a plurality of light emitters and a plurality of light detectors disposed in a pattern about a border surrounding said plurality of discrete locations and above said planar surface;

said plurality of light emitters are paired with said plurality of light detectors;

an electronic circuit that illuminates said light emitters to emit light in a path substantially straight to said light detectors, and to scan said pair of light emitters and light detectors in an unimpeded path above and substantially parallel to and coextensive with said planar surface;

a printed circuit board disposed adjacent to and below said planer surface, connecting said electronic circuit to said plurality of light emitters and said plurality of light detectors; and means for scanning said pair of light emitters and light detectors to detect said operators fingers that break said path of said pair of light emitters and light detectors before said operators finger contacts said planar surface at each of said plurality of discrete locations.

17. A keyboard as claimed in claim 16, further including adjustable gain amplifiers to receive the output of said light detectors so the gain for said adjustable gain amplifiers for detecting ambient light intensities can be different from said gain from said adjustable gain amplifiers for detecting said operators finger.

18. A keyboard as claimed in claim 16, further including variable frequency drive circuits for said light emitters to change the on and off time of said light emitters so different intensities of light emissions from said light emitters can be emitted.

19. A keyboard as claimed in claim 16, wherein a scanning pattern that when a detection is made of an object, said operators finger or ambient light interference, said scanning pattern scans said pairs of light emitters and light detectors for a valid light path immediately before and after said pair of light emitter and light detector that made said detection;

a said valid light path being when said light emitter is illuminated and that emitted light is detected by a predetermined said light detector; and if said valid light path is present immediately before and after said pair of the light emitter and light detector that made said detection, a valid detection of an object is recorded.

20. A keyboard as claimed in claim 16, further including
an upper and lower housing to enclose the electronic circuits with a plurality of environmental seals disposed about the periphery at the connection of said upper and lower housing to seal said keyboard from environmental contaminants.

21. A keyboard as claimed in claim 16, further including
a speaker for generating an audible feedback to said operator for at lease said operators finger detection.

22. A keyboard as claimed in claim 16, further including
adjustable gain amplifiers to receive the output of said light detectors so the gain for said adjustable gain amplifiers for detecting ambient light intensities can be varied, wherein each said light detector that is being scanned to detect at least said operators finger corrects for ambient light intensities prior to scanning for said operators finger; and
whereby the said light emitter is illuminated and said electronic circuit tests a predetermined said light detectors said adjustable gain amplifier for predetermined output limits, if the output is less than said predetermined output limits the gain of the said adjustable gain amplifier is increased and retested, and if the output is higher than said predetermined output limits the gain of the said adjustable gain amplifier is decreased and retested.

23. A keyboard as claimed in claim 16, further including
variable frequency drive circuits for said light emitters to change the on and off time of said light emitters so different intensities of light emissions from said light emitters can be emitted;
adjustable gain amplifiers to receive the output of said light detectors so the gain for said adjustable gain amplifiers for detecting ambient light intensities can be varied, wherein each said light detector that is being scanned to detect at least said operators finger, corrects for ambient light intensities prior to scanning for said operators finger;
whereby the said light emitter is illuminated and said electronic circuit tests said light detectors said adjustable gain amplifier for predetermined output limits, if the output is higher than said predetermined output limits the gain of the said adjustable gain amplifier is decreased end retested, this cycle continues if the said adjustable gain amplifiers output can not reach the said predetermined output limits until the said adjustable gain amplifiers gain is at the lowest setting, at that time said on and off time of the said variable frequency drive circuit is made less on to decrease the emissions from said light emitter and a test is made to see if the said adjustable gain amplifier is in said predetermined limits, this cycle continues until either the said variable frequency drive circuit is at its lowest intensity and the said adjustable gain amplifiers output can not reach said predetermined output limits, in which an error is recorded, or the said adjustable gain amplifier is in said predetermined output limits, in which said electronic circuit then scans for said operators finger; and
if said adjustable gain amplifiers output is lower than said predetermined output limits the gain of the said adjustable gain amplifier is increased and retested, if the output from said adjustable gain amplifiers is still not in limits the said on and off time of the said variable frequency drive circuit is made more on to increase the emissions from the said light emitter and a test is made to see if the said adjustable gain amplifier is in said predetermined limits, this cycle continues until either the said adjustable gain amplifier is in said predetermined limits in which said electronic circuit then scans for said operators finger, or if the said light emitter has been turned on no the highest intensity and the said adjustable gain amplifier is not to said predetermined limits, an error is recorded.

24. A keyboard as claimed in claim 16, further including
means for generating, and means for transmitting and receiving data by radio frequency signals responsive to said keyboard operators data entry.

25. A keyboard as claimed in claim 16, wherein
said keyboard reduces stresses in said operators fingers by removing the impact between said operators fingers and said keyboard; whereby said operators fingers can touch said keyboard although data entry is made prior to contact therebetween.

* * * * *